United States Patent [19]

Taylor et al.

[11] Patent Number: 5,541,382

[45] Date of Patent: Jul. 30, 1996

[54] METHOD AND APPARATUS FOR SPOT WELDING

[75] Inventors: Glen A. Taylor, Richmond; Samuel E. Arrington, Jr., Amelia, both of Va.

[73] Assignee: Reynolds Metals Company, Richmond, Va.

[21] Appl. No.: 248,274

[22] Filed: May 25, 1994

[51] Int. Cl.⁶ .................................................. B23K 11/31
[52] U.S. Cl. ................................... 219/86.25; 219/117.1; 219/120
[58] Field of Search .................................. 219/117.1, 119, 219/120, 86.22, 86.25, 86.32, 86.41

[56] References Cited

U.S. PATENT DOCUMENTS

| | | |
|---|---|---|
| 2,432,750 | 12/1947 | Goldsworthy ................. 219/86.41 |
| 2,946,119 | 7/1960 | Jones et al. . |
| 3,005,902 | 10/1961 | Copleston et al. . |
| 3,236,996 | 2/1966 | Inoue ................. 219/86.32 |
| 3,396,263 | 8/1968 | Even et al. . |
| 3,424,889 | 1/1969 | Inoue . |
| 3,845,271 | 10/1974 | Hirano et al. . |
| 4,047,656 | 9/1977 | McCombs . |
| 4,130,750 | 12/1978 | Bennett et al. ................. 219/119 |
| 4,704,513 | 11/1987 | Sugitani et al. . |
| 4,926,023 | 5/1990 | Sugitani et al. . |
| 4,990,743 | 2/1991 | Kugai et al. . |
| 5,047,608 | 9/1991 | Takahashi et al. ................. 219/119 |
| 5,149,939 | 9/1992 | Imaizumi et al. . |

*Primary Examiner*—Clifford C. Shaw
*Attorney, Agent, or Firm*—Alan M. Biddison

[57] ABSTRACT

A spot welding apparatus adapted particularly for joining aluminum workpieces utilizes a twisting or vibrating motion to break up oxides on the workpiece surface for improved welding and increased welding tip life. In one embodiment, a vibration inducing device is fixed to the electrode holder of a spot welding apparatus for vibrating the electrode tip during welding. In another embodiment, a camming mechanism rotates the electrode tip of the spot welding head in response to the spot welding head contacting the workpiece surface. The electrode tip rotates or twists in a limited arc after the tip contacts the workpiece to break up oxides on the workpiece surface. The electrode tip, upon removal from the workpiece surface, reverses its rotation for subsequent spot welding and to minimize the possibility of the electrode sticking to the workpiece.

4 Claims, 2 Drawing Sheets

METHOD AND APPARATUS FOR SPOT WELDING

FIELD OF THE INVENTION

The present invention is directed to a method and apparatus for spot welding of workpieces, especially aluminum sheet, and in particular, to a spot welding apparatus and method imparting a vibrating or twisting motion to the spot welding head to break up surface oxides on the surface of the workpiece to be welded.

BACKGROUND ART

In the prior art, resistance spot welds are made by passing current through the workpieces by electrodes which apply the welding force. When welding a highly conductive metal such as aluminum, high current must be used to create enough heat to fuse the workpieces. Most of the heat is generated at the faying surface between the two workpieces, and at the work surface between the workpiece and the electrode tip.

In general, it is desirable to generate as little heat as possible at the work surface so as to avoid impairing workpiece surface quality or shortening the electrode tip life. Preferably, most of the heat is generated at the faying surface to weld the workpieces together.

When spot welding aluminum workpieces such as mill surface aluminum sheet, oxides present on the workpiece surfaces interfere with the electrical contact between the electrode tip and workpiece surface. Consequently, excessive heat is generated at the work surface rather than at the faying surface due to the increased electrical resistance caused by the presence of the surface oxides.

This excessive heat generation at the work surface causes sticking of the electrode tip to the surface and pick up of aluminum onto the tip. As result of these effects, the surface quality of the workpieces is impaired and the electrode tip life is shortened.

As such, a need has developed to provide improved apparatus and methods for spot welding workpieces, especially aluminum sheet, which concentrates the welding heat at the faying surface rather than at the workpiece surface. There is also a need to reduce the pick up of aluminum on the electrode tip and increase the electrode tip life.

In response to this need, the present invention provides a spot welding method and apparatus which utilizes a vibrating or twisting motion of the spot welding head to effectively break up any surface oxide present on the workpiece to be welded. This "breaking up" avoids excessive heat generation at the workpiece surface, thereby concentrating the heat at the faying surface for improved spot welding.

In the prior art, apparatus that oscillate electrodes for arc welding are known. U.S. Pat. No. 4,704,513 to Sugitani et al. discloses a groove tracing control method for a fillet welding which rotates a welding torch and thereby rotates an arc thereof at high speed. As shown in FIG. 9 of this patent, the filler wire is rotated thereby producing a weld bead having uniform leg lengths.

U.S. Pat. No. 4,047,656 to McCombs discloses a welding head for metallic arc inert gas welding which is moved by an external guidance system over a workpiece. The external guidance system moves a spindle in a circular or orbital path over the work surface.

In these patents, the oscillating or orbital movement of the filler material is used in combination with longitudinal movement of the welding head to fill the spaces between the workpieces to be welded with filler metal. There is no recognition in these patents of the problems caused by surface oxides in aluminum sheet spot welding.

SUMMARY OF THE INVENTION

Accordingly, it is a first object of the present invention to provide an improved spot welding apparatus, particularly for spot welding of aluminum workpieces.

It is another object of the present invention to provide an improved spot welding method that extends spot welding electrode tip life, provides an improved weld and does not degrade the surface quality of the welded workpieces.

Another object of the present invention is to provide a spot welding apparatus and method which utilizes a vibratory or twisting motion to drive an electrode tip so as to break up surface oxides present on workpieces to be welded to maximize heat generation at the faying surfaces thereof.

Other objects and advantages of the present invention will become apparent as a description thereof proceeds.

In satisfaction of the foregoing objects and advantages, the present invention provides an improvement in a spot welding apparatus having an electrode head which includes an electrode with an electrode tip, an electrode holder and means for supplying current to the electrode for spot welding. In one embodiment, a vibrating inducing device is fixed to or incorporated with the electrode holder. The vibrating inducing device vibrates the electrode a predetermined frequency so that the electrode remains substantial centered on its own axis but breaks up any oxide on the surface of the workpiece to be welded. Preferably, the electrode vibrates in a plane perpendicular to its longitudinal axis.

In an alternative embodiment, the spot welding head includes means for rotating the electrode tip a predetermined number of degrees after the electrode tip contacts the workpiece surface. Limited rotation of the electrode tip in conjunction with movement of the spot welding head drives the electrode tip through oxide present on the surface of the workpiece to be welded to break it up for improved spot welding. The limited rotation of the electrode holder permits the use of flexible leads or lines for supplying welding current or cooling fluid to the welding head without the need for any complex rotary couplings.

According to the inventive method, workpieces, preferably aluminum workpieces, are spot welded together by providing a spot welding apparatus as described above having either the vibration inducing device or the means for rotating the electrode tip in a limited fashion. In one embodiment of the invention, the electrode tip is first vibrated and then placed in contact with an aluminum sheet to be welded to break up any surface oxide thereon such as aluminum oxide and spot weld the aluminum workpieces together. Of course, the tip may contact the surface prior to initiation of the vibrating movement.

In the embodiment using the limited twisting or rotative movement of the welding head, the welding head first contacts the workpiece to be welded. Following contact, further application of force of the welding head against the workpiece provides the limited rotative movement of the electrode using a camming mechanism on the spot welding head. This limited rotative movement breaks up any surface oxide present on the workpieces surfaces and effectively spot welds the workpieces together.

In a preferred embodiment, the camming mechanism includes an electrode guide which interfaces with the electrode holder to cause the limited rotative movement of the electrode when the spot welding head is applied to the workpiece surface to be welded. A spring mechanism maintains controlled pressure of the electrode on the workpiece surface to be welded as the welding head is applied.

BRIEF DESCRIPTION OF THE DRAWINGS

Reference is now made to the drawings wherein.

DESCRIPTION OF THE PREFERRED EMBODIMENTS

The present invention overcomes the problems associated with prior art spot welding apparatus such as impaired surface quality due to pick up of the workpiece material onto the electrode tip or inadequate electrode life.

The present invention overcomes these problems through the utilization of a vibrating or limited rotative movement of the electrode during the spot welding of workpieces. This vibratory or limited rotative movement permits the electrode tip to break through or break up surface oxides present on the workpiece and to concentrate the welding heat at the faying surface rather than the workpiece surface. This concentration of the welding heat at the faying surface eliminates or minimizes any adverse interaction between the electrode tip and the workpiece surface. As a result, the electrode tip life is increased and spot welds of superior quality are achieved.

Figure 1:
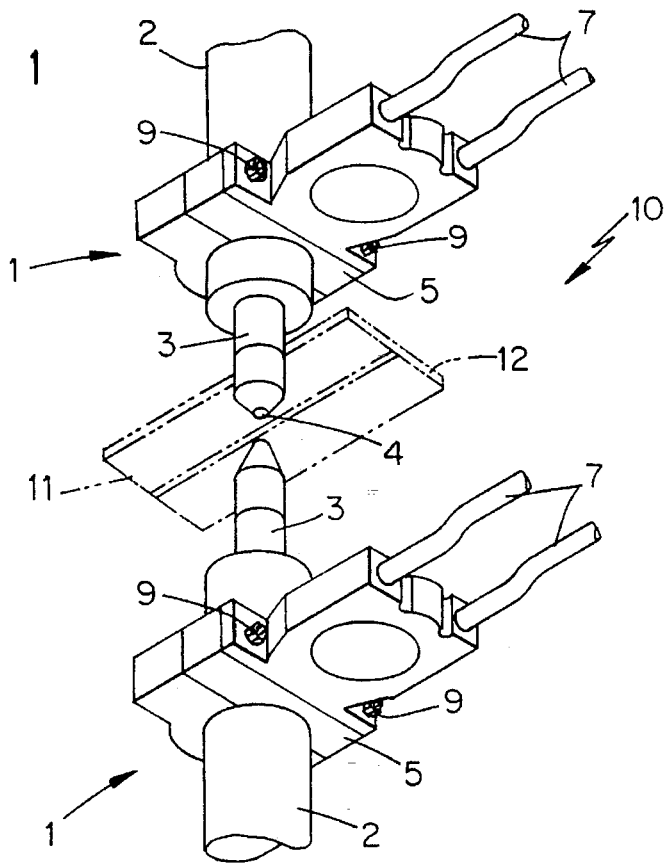
FIG. 1 is a perspective view of a first embodiment of the inventive spot welding apparatus.

With reference to FIG. 1, a first embodiment of the inventive spot welding apparatus is generally designated by the reference numeral 10 and seen to include opposing spot welding heads 1. Each head 1 includes an electrode holder 2 and an electrode 3, the electrode terminating in an electrode tip 4.

Fixed to the electrode holder 2 is a vibration inducing device 5. The vibration inducing device is powered by leads 7 and is secured to the electrode holder 2 using the fasteners 9. The vibration inducing device 5 can be powered either electrically or pneumatically as is well known in the prior art. Moreover, although the vibration inducing device 5 is shown surrounding the electrode holder 2, it can also be incorporated therein as part of the electrode holder itself.

FIG. 1 also depicts a pair of sheet workpieces 11 and 12 to be spot welded by the heads 1. In use, the vibration inducing devices 5 are turned on as the electrode tips approach the workpieces through manipulation of a movable support arm (not shown) and continue to vibrate for a period of time after the tips establish contact. The spot weld is then made and the electrode tips are retracted from the workpiece surfaces. Preferably, the vibration inducing device 5 is fixed to the electrode holder such that the electrode vibrates transverse to its axis. This movement assists in breaking up surface oxides present while keeping the electrode centered to assure a spot weld having a precise and desired size.

The vibration inducing devices can utilize different frequencies and amplitudes to vibrate the electrode tips 4 to break up any surface oxide on the workpieces 11 and 12 to generate as much heat as possible at the faying surface. Preferred frequencies depend on the type of vibrating inducing device. Pneumatic devices have been tested operating at about 300 Hz.

The vibration inducing device 5 can be any device capable of vibrating at a specific frequency to break up the oxide surface on the workpiece to be spot welded. Mechanical or pneumatic vibrators, e.g. those using an eccentric weight can be utilized ranging in frequency from about 50 to several thousand Hz, e.g. 3000 Hz.

Alternatively, ultrasonic transducers can be employed in conjunction with the electrode holder. Typically, these types of vibrators range in frequency from about 60 KHz to up to several hundred KHz, e.g. 300 KHz. In this embodiment, it is preferred that the ultrasonic transducer is mounted to the electrode holder such that the ultrasonic vibration is generally transverse to the axis of the electrode. However, the ultrasonic vibrations can also be induced axially along the electrode.

Electromechanical devices can also be used to vibrate the electrode holder in frequency ranges similar to that disclosed for the mechanical vibrators.

The vibration induced into the electrode can be either longitudinal vibrations along its axis or transverse vibrations at right angles to the axis. When using low frequencies, it is preferred to have the vibrations extend transverse to the electrode axis to facilitate breaking up the surface oxide on the workpiece.

Since the electrode tips 4 drive through and break up the oxide layer present on workpieces such as aluminum, pick up of aluminum onto the electrode tips 4 is avoided. Further, sticking of the electrode tips 4 to the aluminum workpiece surface is also minimized. Thus, the useful life of the electrode is greatly extended and the weld quality is more consistent.

Figure 2:
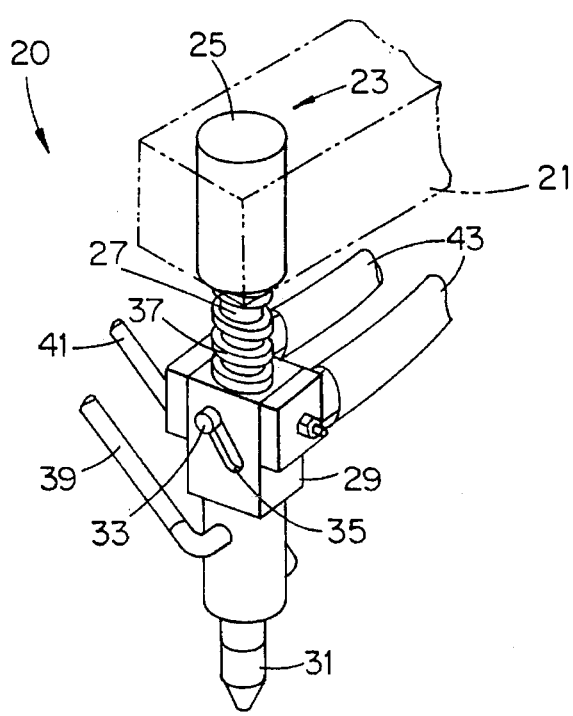
FIG. 2 is a perspective view of a second embodiment of the spot welding apparatus of the invention.
Figure 3:
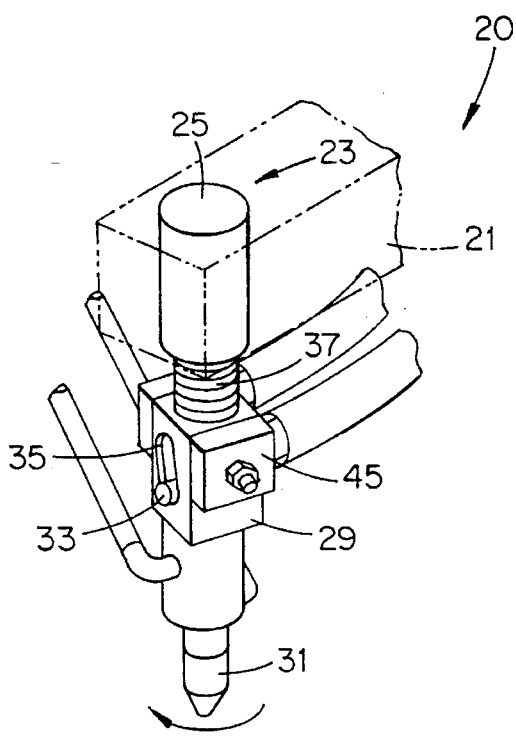
FIG. 3 is a perspective view similar to FIG. 2 shown in its rotated position.

It should be understood that the spot welding apparatus depicted in FIG. 1 does not show the leads supplying the necessary current to the electrodes 3 for spot welding of the workpieces 11 and 12 or the moveable support structure because current is transmitted directly thru the electrode holder 2 from the welding machine or gun. Thus, the holder 2 provides means for supplying current to the electrode for spot welding. Since these aspects of the invention are conventional, no further explanation is deemed necessary for understanding of the invention. With reference to FIGS. 2 and 3, a second embodiment of the spot welding apparatus of the invention is generally designated as reference numeral 20, depicting a spot welding head. In this embodiment, the spot welding head 20 is supported by a movable support arm 21 via the electrode guide 23.

The electrode guide 23 comprises a guide end 25 which is fixed to the movable support arm 21. Extending from the guide end 25 is a smaller diameter guide stem 27, the distal end thereof (not shown) engaging a correspondingly sized opening in an electrode holder 29. The electrode holder 29 terminates in the electrode tip 31. The guide stem 27 slides and rotates within the electrode holder 29.

The guide stem 27 of the electrode guide 23 includes a cam follower 33 protruding from its cylindrical outer surface. The cam follower 33 is sized to engage a follower slot 35 in the electrode holder 29.

The spot welding head 20 also includes a compression spring 37 which surrounds the guide stem 27 and is disposed between the guide end 25 and the electrode holder 29. The spot welding head 20 also includes a flexible cooling fluid inlet 39 and outlet 41 which supply cooling fluid to the electrode holder during spot welding. The electrode holder 29 also has a pair of flexible power leads 43 which are attached thereto at reference number 45 for supplying the necessary current to the electrode for spot welding. FIG. 2 shows the spot welding head 20 in an inoperative position wherein the compression spring 37 is expanded such that the cam follower 33 is engaged in the upper portion of the slot 35. As will be further described hereinafter, downward movement of the moveable support arm 21 first provides contact between the electrode tip 31 and a surface to be welded followed by rotation of the electrode 31 in a limited fashion through the camming motion caused by interaction between the cam follower 33 and follower slot 35. The compression spring 37 applies force in a controlled manner from the electrode to the surface to be welded.

Figure 4:
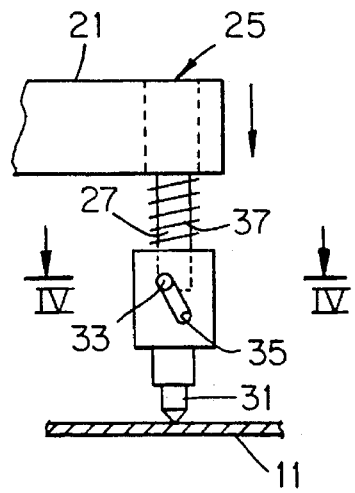
FIGS. 4–6 are schematic views of the apparatus depicted in FIGS. 2 and 3 showing the rotative movement thereof.
Figure 7:
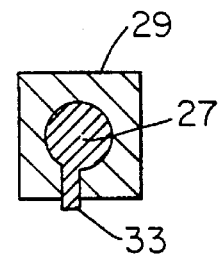
FIGS. 7–9 are cross-sectional views taken along the lines IV—IV, V—V and VI—VI of FIGS. 4–6, respectively.
Figure 5:
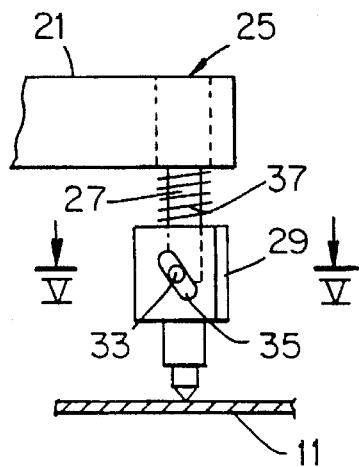
Figure 6:
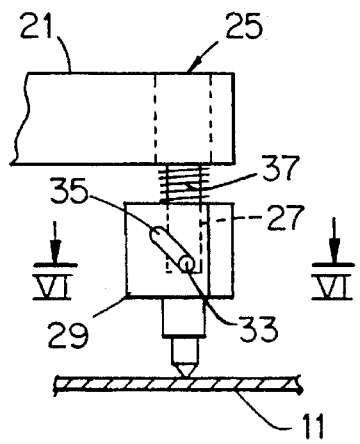

With reference to FIGS. 4–6, a schematic representation is shown depicting the limited rotative movement of the spot welding head 20 using the camming mechanism thereof. In FIG. 4, the moveable support arm 21 forces the electrode tip 31 in contact with the workpiece 11. The compression spring 37 provides a spring bias against the electrode holder 29 so that the cam follower 33 is uppermost in the follower slot 35. FIG. 7 shows the relationship between the electrode holder 29 and guide stem 27 upon initial contact between the electrode tip 31 and workpiece 11, i.e. no rotation of the electrode holder.

Figure 8:
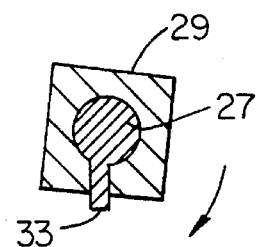

Further downward movement of the moveable support arm 21 compresses the spring 37 and drives the distal end of the guide stem 27 within the electrode holder 29 to longitudinally translate the cam follower 33 downward. This downward movement of the stem 27 moves the cam follower 33 in the follower slot 35 to a halfway position as shown in FIG. 5. Since the guide stem 27 freely engages the electrode holder 29, the electrode holder 29 rotates as a result of the camming action of the cam follower 33 in the slot 35, see FIG. 8. Further downward movement of the movable support arm 21 further compresses the spring 37 and drives the cam follower 33 into the bottom of the follower slot 35, see FIG. 6. This downward motion of the cam follower 33 further rotates the electrode holder 29 in a first direction, as shown in FIG. 9.

Figure 9:
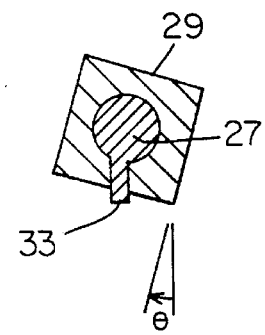

FIG. 9 depicts the extent of the limited rotation of the electrode holder and electrode tip against the surface 11 of the workpiece. This limited rotative movement effectively breaks up any oxide on the workpiece surface to concentrate the welding heat at the workpiece faying surface rather than at the surface in contact with the electrode tip.

Upon upward movement of the movable support arm 21, the spring bias inherent in the compression spring 37 biases the electrode holder 29 away from the movable support arm to put the spot welding head 20 in the inoperative position as shown in FIG. 4 so that it is ready for a subsequent spot welding sequence. Upward movement also rotates the electrode holder 29 in a direction opposite the first direction. In other words, movement of holder 29 away from the workpiece reverses the rotation of the holder 29 from the position shown in FIG. 9 back to the position shown in FIG. 7. Rotation of the electrode tips as the support arm and guide move upward (or away from the workpiece, after the weld) prevents sticking of the electrode to the workpiece and the associated possibility of pulling a "plug" of aluminum out of the workpiece with the tips.

This "plug" of aluminum on the tips usually produces a "blowout" on the next weld. The "blowout" is caused by an arc between the tip and the workpiece During the "blowout" molten metal sprays out from the workpiece and the tips are usually ruined.

The limited rotative movement of the electrode holder 29 and electrode 31 permits supply of power and cooling fluid to the spot welding head using the flexible leads and inlet and outlet as shown in FIGS. 2 and 3. This limited rotative movement avoids complex mechanical coupling arrangements such as rotative couplings for power and/or cooling fluid supply to the electrode during rotation thereof.

In a preferred embodiment the electrode rotation ranges between 1° and 135°, more preferably between about 10° and 20°, the rotation represented by the angle Θ as shown in FIG. 9. However, other rotative arcs can be utilized to provide the limited rotative movement. It is anticipated that a limited rotative movement up to 135° still permits power and cooling fluid supply to the electrode head using flexible lines. Tests using this embodiment have shown in excess of 6000 welds for a given electrode.

It should be understood that any means for achieving the limited rotative movement of the electrode head can be utilized in conjunction with the inventive spot welding apparatus. These means may include a motorized drive assembly which, when actuated, could rotate the electrode its predetermined arc of rotation and reverse itself for subsequent spot welding operations.

Alternatively, the electrode holder could rotate by a cam follower attached to the electrode holder engaging a follower slot in the electrode guide. In this embodiment, the electrode holder would be cylindrical to engage a corresponding opening in the electrode guide.

It should also be understood that one or two spot welding heads may be utilized in the inventive apparatus and method, depending on the type of material to be spot welded. In addition, although it is preferred to spot weld aluminum workpieces such as mill finish aluminum sheet, particularly automotive body sheet, the inventive spot welding apparatus and method can be applied to any materials capable of being spot welded together.

As such, an invention has been disclosed in terms of preferred embodiments thereof which fulfill each and every one of the objects of the present invention as set forth hereinabove and provides a new and improved method and apparatus for spot welding.

Of course, various changes, modifications and alterations from the teachings of the present invention may be contemplated by those skilled in the art without departing from the intended spirit scope thereof. Accordingly, it is intended that the present invention only be limited by the terms of the appended claims.

What is claimed is:

1. A spot welding apparatus comprising:
   a) an electrode tip for spot welding a workpiece;
   b) an electrode holder fixedly attached to said electrode tip;
   c) means for supplying current to said electrode tip via said electrode holder, said current supplying means being flexibly attached to said electrode holder;
   d) a moveable electrode guide arm having an elongated stem extending therefrom, said elongated stem having a follower extending therefrom, said electrode holder having smooth faced cylindrical bore therein sized to receive said elongated stem and having a follower slot in a wall thereof sized to receive said follower; and e) a spring positioned between said moveable electrode guide arm and said electrode holder to bias said electrode holder away from said movable electrode guide arm;

f) wherein contact of said electrode tip against said workpiece biases said electrode holder towards said moveable guide arm, movement of said electrode holder causing said follower to travel with respect to the follower so that said electrode holder and electrode tip rotate a predetermined number of degrees, rotation of said electrode tip during contact with said workpiece breaking up oxide present on a surface of the workpiece.

2. The spot welding apparatus of claim 1, wherein said follower slot is sized in length such that said predetermined number of degrees of rotation of said electrode tip ranges between 1° and 135°.

3. The spot welding apparatus of claim 1, wherein said spring comprises a compression spring surrounding said elongated stem and being disposed between said movable electrode guide arm and said electrode holder.

4. The spot welding apparatus of claim 1, further comprising means for cooling said electrode, said cooling means including flexible cooling fluid inlet and outlet lines to permit said rotation of said electrode holder.

* * * * *